(12) United States Patent
Rombouts et al.

(10) Patent No.: US 10,650,147 B2
(45) Date of Patent: May 12, 2020

(54) METHOD AND APPARATUS FOR ENSURING CONTROL FLOW INTEGRITY

(71) Applicant: NXP B.V., Eindhoven (NL)

(72) Inventors: Peter Maria Franciscus Rombouts, Leuven (BE); Eric Vos, Leuven (BE)

(73) Assignee: NXP B.V., Eindhoven (NL)

( * ) Notice: Subject to any disclaimer, the term of this patent is extended or adjusted under 35 U.S.C. 154(b) by 277 days.

(21) Appl. No.: 15/190,724

(22) Filed: Jun. 23, 2016

(65) Prior Publication Data
US 2017/0024562 A1  Jan. 26, 2017

(30) Foreign Application Priority Data
Jul. 22, 2015 (EP) .................................... 15177952

(51) Int. Cl.
*G06F 21/56* (2013.01)
*G06F 21/52* (2013.01)

(52) U.S. Cl.
CPC ............ *G06F 21/566* (2013.01); *G06F 21/52* (2013.01); *G06F 2221/033* (2013.01)

(58) Field of Classification Search
CPC ........ G06F 21/52; G06F 21/566; G06F 21/56; G06F 21/50; G06F 2221/033
See application file for complete search history.

(56) References Cited

U.S. PATENT DOCUMENTS 7,739,740 B1 *  6/2010  Nachenberg .......... G06F 21/566
                                                    709/206
8,645,923 B1 *  2/2014  Satish ..................... G06F 21/52
                                                    717/131
(Continued)

FOREIGN PATENT DOCUMENTS

EP         2919146 A1     9/2015

OTHER PUBLICATIONS

Akritidis, P., et al., "Preventing Memory Error Exploits with WIT", 2008 IEEE Symposium on Security and Privacy.
(Continued)

*Primary Examiner* — Saleh Najjar
*Assistant Examiner* — Devin E Almeida

(57) ABSTRACT

A control flow enforcement solution for ensuring that a program or portion thereof behaves as expected during execution upon a processor. A reference control flow is pre-determined for the program using, for example, a control flow graph (CFG). The CFG is then analysed to provide a set of rules which describe how the program should behave under normal execution. As the program executes it is monitored and the rules are evaluated to enable detection of any unexpected control flow. An embodiment of this disclosure is configured to respond upon detection that a rule has been violated. The response can take the form of any appropriate intervention such as a processor interrupt, memory fault, processor reset or generation of an alert. In this way, an embodiment of this disclosure may provide a particularly effective mechanism for detecting and defending against malicious activities such as return oriented programming attacks. The invention can be utilised to effect with any program but may be particularly suited for use with programs executing upon embedded processors.

17 Claims, 2 Drawing Sheets

(56) References Cited

U.S. PATENT DOCUMENTS

| | | | | |
|---|---|---|---|---|
| 8,645,933 B2* | 2/2014 | Schwartz | G06F 8/456 | 717/151 |
| 8,881,293 B1* | 11/2014 | Brucker | G06F 21/577 | 717/126 |
| 9,009,822 B1* | 4/2015 | Ismael | G06F 21/566 | 726/22 |
| 9,953,158 B1* | 4/2018 | Benameur | G06F 21/52 | |
| 2013/0036464 A1* | 2/2013 | Glew | G06F 21/52 | 726/22 |
| 2014/0156972 A1* | 6/2014 | Shanbhogue | G06F 9/30145 | 712/205 |
| 2014/0283040 A1* | 9/2014 | Wilkerson | G06F 21/52 | 726/22 |
| 2015/0095617 A1* | 4/2015 | Shanbhogue | G06F 9/30054 | 712/208 |
| 2015/0106872 A1* | 4/2015 | Hiser | G06F 21/56 | 726/1 |
| 2015/0113640 A1* | 4/2015 | Krten | G06F 21/57 | 726/22 |
| 2015/0180875 A1* | 6/2015 | Kay | H04W 12/08 | 726/4 |
| 2016/0110269 A1* | 4/2016 | Sahita | G06F 21/53 | 714/38.11 |
| 2016/0300060 A1* | 10/2016 | Pike | G06F 17/30371 | |

OTHER PUBLICATIONS

Xia, Y., et al., "CFIMon: Detecting Violation of Control Flow Integrity using Performance Counters", Institute of Parallel and Distributed Systems, Shanghai Jiao Tong University, 2012 IEEE.

Skowyra, R., et al., "Systematic Analysis of Defenses Against Return-Oriented Programming", Research in Attacks, Intrusions and Defenses, vol. 8145 of the series Lecture Notes in Computer Science, pp. 82-102, 2013.

Roemer, R., et al., "Return-Oriented Programming: Systems, Languages, and Applications", ACM Transactions on Information and System Security (TISSEC), vol. 15, Issue 1, Mar. 2012.

Extended European Search Report dated Dec. 18, 2015 in EP Application No. 15177952.7.

Davi, L., "MoCFI: A Framework to Mitigate Control-Flow Attacks on Smartphones", Proceedings of the 19th Network and Distributed System Security Symposium, Feb. 7, 2012.

Jacobson, E., "Detecting Code Reuse Attacks with a Model of Conformant Program Execution", Network and Parallel Computing, pp. 1-18, Feb. 26, 2014.

Krahmer, S., "x86-64 buffer overflow exploits and the borrowed code chunks exploitation technique", SUSE Sep. 29, 2005.

Shacham, H., "The geometry of innocent flesh on the bone: return-into-libc without function calls (on the x86)", Proceedings of the 14th ACM CCS 2007.

* cited by examiner

METHOD AND APPARATUS FOR ENSURING CONTROL FLOW INTEGRITY

This application claims the priority under 35 U.S.C. § 119 of European Patent application no. 15177952.7, filed on 22 Jul. 2015, the contents of which are incorporated by reference herein.

The present invention relates generally to the security of computers and programs which execute on them, and more particularly to detecting and/or protecting against attacks which seek to divert or alter the flow of execution of a program. The invention is suited for, but not limited to, use with programs arranged for execution on an embedded controller. It may be utilised in relation to any computer system in which the integrity of the system can be jeopardised by, for example, by deliberate manipulation or by cosmic rays, electrostatic discharge or unexpected operating conditions.

A program consists of a sequence of instructions which will be executed in a predetermined order by a processor repeating a machine cycle which, for example, consists of three phases:
1) Fetch a copy of an instruction from main memory; the address of the instruction is specified by the contents of the Program Counter (PC);
2) decode the instruction that was fetched;
3) execute it.

At the machine level, all instructions, addresses and data are stored and manipulated in binary form. An instruction comprises an opcode which specifies the type of operation to be performed and (usually) one or more operands. An opcode may, for example, specify an arithmetic or logical instruction such as ADD X, Y; or program control such as JUMP X, which causes address X to be loaded into the PC so that the instruction at address X will be fetched, decoded and executed during the next cycle. In this way, a program's flow may branch off down different paths. A control flow graph (CFG) can be used to capture all the possible paths that could be taken during normal i.e. non-compromised execution of the program.

However, an attacker can divert the expected flow of a program using a technique known as Return Oriented Programming (ROP).

In an ROP attack, the binary code is searched for short sequences which the attacker can chain together. These instruction sequences (known as 'gadgets') can then be used to perform defined tasks and introduce unintended behaviour into the program. The instruction sequences are typically chosen so that each gadget ends in a return instruction or equivalent which, if the attacker has control of the run-time stack, allows control to flow from one sequence to the next.

Defending against this type of attack is possible using software countermeasures.

An alternative solution has now been devised. The invention is defined in the appended claims.

The invention may provide a computer-implemented method of control flow enforcement, comprising the steps:
  analysing a reference control flow generated in respect of a portion of code to derive at least one control flow rule; and
  evaluating the at least one control flow rule during execution of the portion of code to facilitate detection of a deviation from the reference control flow.

In one embodiment, the method may comprise the step of providing a rule checking component configured to evaluate, apply or check the at least one rule during execution of the portion of code. The rule checking component may be implemented as, or within, a hardware unit. It may be implemented as or within a virtual machine. The rule checking component may comprise or be in communication with memory for storing the at least one control flow rule, and/or an intervention unit configured to generate a response upon detection of a deviation from the reference control flow.

The reference control flow may provide a means for predicting the expected execution of a program under normal operating conditions. It may express the manner in which the program is to operate, for example a series of expected function calls.

The portion of code may comprise a sequence of instructions. It may be an entire program or a part thereof. It may be at least a portion of a machine or low level language program. It may be static i.e. not changing over time, or non-static.

In one embodiment, a plurality of control flow rules is derived from the reference control flow. The control flow rule(s) may define run-time behaviour which is expected or legitimate according to the reference control flow. As the reference control flow may be generated for a particular portion of code, the plurality of control flow rules generated therefrom may be specific to the portion of code.

Evaluation of the at least one control flow rule may be triggered or determined by the contents of the program counter (PC), an instruction opcode, a flag and/or a register value. The rule may be selected from a plurality of rules based upon the contents of the PC and/or an instruction opcode. A rule may be selected and evaluated for each instruction that is executed. The rule may be defined based, for example, upon the current value of the program counter (PC), the previous value of the PC (pPC), the current instruction opcode (OP), the previously executed instruction opcode(s) (xOP) or the opcode before the current opcode (pOP). Other forms of rules may also be incorporated or devised.

The at least one control flow rule may impose a restriction on the way that the program is allowed to execute. It may, for example, limit the distance of a JUMP, forbid certain instructions (opcodes) or patterns of opcodes from being used. Additionally or alternatively, a rule may be configured such that it is only applied, for example, in respect of a specified region of code memory, or when a specified external signal is applied.

In one embodiment, the reference control flow and/or at least one control flow rule is generated prior to execution of the portion of code. The reference control flow may be generated by executing the portion of code under normal operating conditions to determine the set of legitimate paths that may be taken by the portion of code. The at least one control flow rule may then be generated from the reference control flow to provide a rule-based description or definition of the code's expected behaviour. The rule(s) can then be checked at run-time to evaluate whether or not the code is behaving as intended.

This can allow an embodiment of this disclosure to be used with an existing portion of code. Accordingly, an embodiment of this disclosure need not require the use of a specially adapted or designed instruction set, or a specially designed software development tool. The source code may not even be required. As long as the program can be executed under normal conditions so as to generate the reference flow, the rules can be generated and applied.

In one embodiment, the reference control flow is a control flow graph (CFG). Thus, an embodiment of this disclosure may enable an observed program flow to be assessed or evaluated against a reference program flow which may be encoded as a CFG. As the size of a CFG can be very large, typically even larger than the program binary itself, direct assessment of a program flow against the reference CFG can give rise to a variety of implementation difficulties such as storage overhead, memory bandwidth saturation and the need for a large comparison logic due to the amount of data that would need to be analysed. An embodiment of this disclosure may provide a mechanism for utilising the reference control flow while avoiding such problems.

In one embodiment, the method may further comprise the step of observing or monitoring the execution of the portion of code. This may be achieved by observing signals sent over a signal bus and/or observing internal signals from a processor.

The method may further comprise the step of generating a response upon detection of a deviation from the expected control flow. The response may be encoded as part of the rule. The response may comprise, for example: triggering an interrupt for a processor; halting a processor; generating a memory fault; logging an entry into a fault log; and/or generating an alert. The response may be selected from a plurality of possible responses which may be executed upon detection of a deviation from the expected control flow. The response may depend upon the nature and/or severity level of the deviation.

In one embodiment, the method may comprise the step of analysing the portion of code to derive the reference control flow and identify at least one possible attack mechanism for a security attack. The security attack may be a Return Oriented Programming attack. The attack mechanism may be a gadget. Additionally or alternatively, the method may comprise the step of testing a plurality of control flow rules against the reference control flow and recording the number of attack mechanisms (eg gadgets) eliminated by each rule in the plurality. Additionally or alternatively, it may comprise the step of identifying a subset of the plurality of rules to provide a reduced rule set. The reduced rule set may be selected so as to maximise the number of attack mechanisms addressed or eliminated by the rule set. This may provide the benefit of a trade-off between cost and performance.

Also in accordance with the invention, there may be provided an apparatus for performing any embodiment of the method described above.

The invention may provide a computer-implemented system for enforcing the control flow of a program. The system may comprise:
  memory for storing at least one control flow rule derived by analysis of a reference control flow generated in respect of a portion of code; and
  at least one processor configured to execute the portion of code; and
  a rule checking component arranged to evaluate the at least one control flow rule during execution of the portion of code to facilitate detection of a deviation from the reference control flow.

The system may comprise a hardware unit or virtual machine configured to implement the method described above. The system may comprise a rule checking component having, or in communication with, memory for storing the at least one control flow rule and/or an intervention unit configured to generate a response upon detection of a deviation from the reference control flow. The rule checking unit may be a hardware unit. It may be implemented using a programmable (logic) component. It may be a Field-Programmable Gate Array (FPGA). The FPGA may be provided in proximity to the processor. It may be arranged and configured to select which rule(s) to apply for an observed instruction.

The rule checking component may be configured to observe or monitor the execution of the portion of code. The reference control flow may be a control flow graph.

The system may comprise an intervention component arranged to generate a response upon detection of a deviation from the expected control flow. The response may comprise, for example, a processor interrupt; a halt signal for halting a processor; a signal for generating a memory fault; an entry in a fault log; and/or an alert. Other forms of response may be utilised.

The reference control flow and/or at least one control flow rule may be generated prior to execution of the portion of code. The rule checking component may be configured to evaluate the at least one control flow rule based upon, for example, the contents of the program counter, an instruction opcode, a flag and/or a register value. Other variations may be devised.

Accordingly, embodiments of this disclosure can provide a method and corresponding system for monitoring control flow during program execution and/or assessing control flow integrity.

It should be noted that any feature described above in relation to one aspect or embodiment of the invention may also be applicable to and incorporated into another other aspect or embodiment. For example, subject matter described in relation to a method of the invention may also be applicable to a system of the invention, and vice versa.

These and other aspects of the present invention will be apparent from and elucidated with reference to, the embodiment described herein. An embodiment of the present invention will now be described, by way of example only, and with reference to the accompany drawings, in which.

Embodiments of this disclosure can provide a rule-based solution enforcing program control flow. An expected control flow is pre-determined ie prior to execution of the program using a control flow graph (CFG) which is then analysed to provide a set of control flow rules relating to the expected behavior of the program under normal operating circumstances. Once the rules have been generated, they can be stored for subsequent retrieval and application.

During execution of the program by one or more processors, the program state can be observed and monitored. The rules are repeatedly checked to determine whether the program's unfolding execution conforms to the flow defined by the CFG. If at any point a rule is found to have been violated, an intervention of some type is generated to respond appropriately.

Thus, in broad terms, the embodiments of this disclosure can be said to comprise the following steps:
 1. determine how the program (or a portion of it) is expected to behave under normal circumstances;
 2. define and store a set of rules describing the expected behavior;
 3. execute the program on a processor and use the appropriate rule(s) to determine at each point in the execution whether the program is behaving as expected;
 4. generate a response if a rule has been violated.

Accordingly, embodiments of this disclosure can provide a mechanism for detecting abnormal control flows such as may be brought about by a ROP attack and eliminating or reducing its harmful effects. This enhances security and provides a more reliable computer system.

The rules set may be designed in different ways. For example, a rule may be devised to address each possible scenario which could arise during an attack at run time. However, while this approach can provide a functionally sophisticated defence mechanism, it can also result in a large, complex set of rules which, in turn, require more hardware and logic to implement.

Thus, another approach to designing the rule set is to devise a reduced set of rules which addresses an acceptable number of possible attack scenarios. Such an approach can be as follows:

1. analyse the target program to arrive at both the CFG and a list of 'attackable' positions (gadgets) for a ROP; techniques and tools are known in the art for such purposes;
2. devise a set of rules for handling the gadgets identified in step 1
3. test at least some of the rules devised in step 2 against the CFG; for each tested rule, count the number of gadgets which are eliminated by that rule;
4. identify a minimal subset of rules that maximize the number of eliminated gadgets.

This 'reduced rule set' approach provides the advantage that it allows a trade off or compromise between the cost and performance of the countermeasure.

Figure 1:
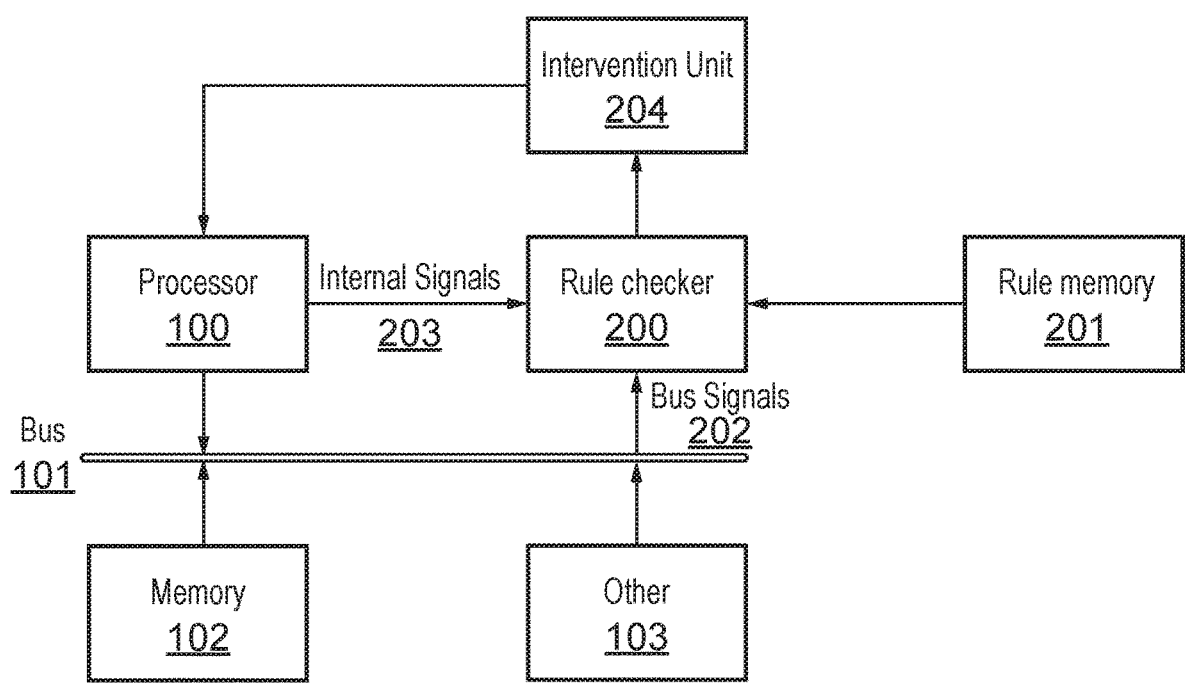
FIG. 1 illustrates an embodiment of this disclosure having a dedicated rule memory.

Turning to FIG. 1, an illustrative architecture is shown for implementing a program flow enforcement unit in accordance with an embodiment of this disclosure. In one embodiment, this architecture is implemented as a hardware unit. For example, a PFGA can be used to provide the required logic. However, other implementations may be utilised to similar or same effect. For example, the program flow enforcement solution could be implemented as part of a virtual machine.

In one or more embodiments, the system may comprise a rule checking unit which is in communication with a separate memory resource containing additional data and/or logic for specifying which rule is to be applied to which instruction. Alternatively, the additional data and/or logic may be incorporated into the rule set itself so that the separate memory is not required. In either architecture, however, there is a mechanism which specifies which rule or rules are to be applied to a particular instruction.

FIG. 1 depicts an exemplary processor system comprising a processor (100) connected via a signal bus (101) to system memory (102) and other system components (103). Also depicted in FIG. 1 is an embodiment of the present disclosure comprising a rule checking unit (200) which compares a set of rules stored in rule memory (201) to the observed behaviour of the processor (100). It does this by observing signals (202) sent over the signal bus (101) and/or observing internal signals (203) from the processor (100). When a violation of these rules is detected or observed it intervenes through an intervention unit (204).

Figure 2:
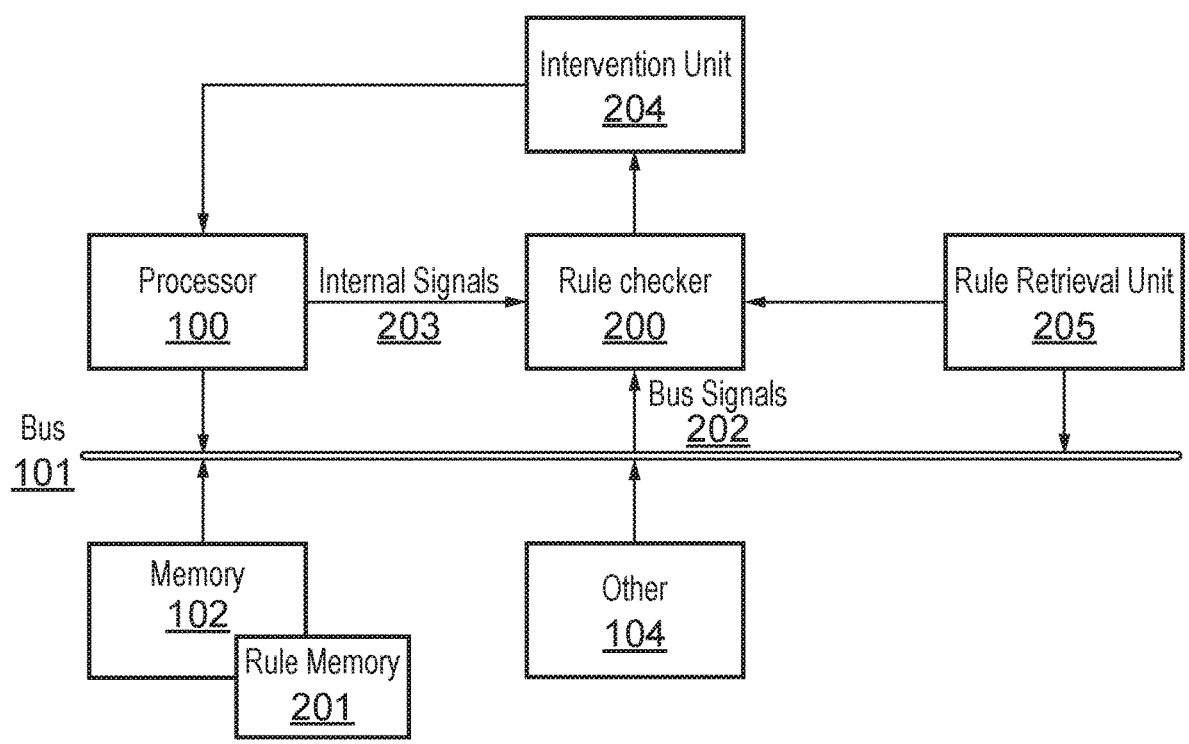
FIG. 2 illustrates an embodiment of this disclosure with rule memory located in system memory.

FIG. 2 depicts an alternative embodiment wherein the set of rules (201) is stored in system memory (102). During execution of the observed program these rules are retrieved from the system memory (102) and provided to the checking unit (200) via a rule retrieval unit (205). This arrangement can be beneficial because such a rule retrieval unit could take advantage of instruction pipelining on modern processors (100) to pre-fetch and cache the rules for to-be-executed instruction's addresses.

Below is an exemplary list of rules which could be checked by the rule checker. The following is not to be interpreted as an exhaustive list. The rule set may comprise other rules in addition to or instead of those mentioned below. The set may comprise any rules that can be derived from analysis of the CFG generated in respect of the software running on the processor system.

Rule 1: Previous PC Should=Current PC−Previous Instruction Size

This rule enforces linear program flow. During linear flow, the next instruction in the sequence is fetched, decoded and executed. The address where the next instruction is to be fetched from in main memory is specified by the contents of the PC. Therefore, if the CFG specifies that linear program flow is expected, then the previous value of the PC should equal the current value minus the size of the previous instruction in bytes.

The instruction size depends on the program and the processor architecture. While some architectures are designed around fixed-length instructions, others can include variable length instruction sets. Therefore, multiple instances or variations of this rule may be provided to account for architectures which allow for instructions of different sizes.

Rule 2: Always Execute

This rule can be used to execute a specified instruction without question or checks. This may be appropriate in circumstances where there is no available information regarding the previously executed instruction or address. Such circumstances might include, for example, the first instruction to be executed after a processor reset, or when the instruction/address can be executed at any time e.g. the first instruction of an exception handler.

Rule 3: Never Execute

This rule can be used to mark at least one address as non-executable. These might be addresses of literals (constant data blocks and addresses) that are intermixed with executable code, or parts of long instruction words that are not the start of the instruction (when the instruction spans over multiple addresses).

This technique allows much finer access specification than the usual access protection schemes that are based on address ranges.

Rule 4: Previous Instruction is not an Indirect Jump

Indirect jumps that obtain their destination from writeable memory or from a register can be more easily exploited by ROP attacks. This rule helps to prevent that by marking all addresses/instructions that ought never to be accessed in this way according to the CFG. It also provides a mechanism for avoiding the need to check a potentially long list of allowed possibilities. Therefore, while this rule results in a less than accurate CFG check it still provides a very effective defence and detection technique.

Rule 5: Previous Instruction is a Static Jump

At many points the program flow is not linear although still very predictable. This rule prevents arbitrary predecessors in the sense that only jumps with fixed destinations (encoded in the instruction) are allowed.

Rule 6: The Previous Instruction has a Specific Length

This rule is similar to rule 1, but also works when the program flow is not linear. Any predecessor with the wrong instruction length is rejected. It will be apparent to the skilled person that this rule is only useful if not all instructions have the same length.

Rule 7: The Previous Instruction was Conditionally Executed.

This rule applies to all instructions whose execution or effect depends on a certain condition, this includes conditional jumps and conditional operations such as ADDIF<flag>. This rule may be further enforced by double checking the condition under which the instruction should/should not have been executed.

Rule 8: The Instruction is a Memory Access to a Specific Memory Region

The region in question can be defined by lower and upper bounds which could be set globally, could depend on the address of the currently executed instruction, or could be defined as part of the rule. This rule can be used to enforce that the instruction is e.g. only allowed to access the stack space.

During use, as the observed program executes, instruction addresses and/or opcodes are examined by the rule checker 200. The address or opcode of an observed instruction determines which rule applies. Thus, for each observed signal (ie. instruction) there is always at least one rule that can be checked—even if it is the 'always execute' rule. Therefore, as the program execution progresses, an embodiment of this disclosure can continuously monitor and analyse the behaviour in comparison to the CFG and respond accordingly.

In one or more embodiments, only one rule may be checked for each instruction. Thus, by selectively enforcing the most stringent rule for a given instruction, the complete arsenal of rules can be used in an effective manner while the need for rule memory is reduced.

The embodiment described above may require no modification to the software creation process. The programmer can program freely without having to abide by certain coding rules or restrictions and the software can be created using a standard development toolchain.

What is claimed:

1. A computer-implemented method of control flow enforcement, comprising:
   generating a reference control flow during an execution of a portion of code under a normal operating condition, wherein the reference control flow indicates expected execution of a portion of code;
   generating for the portion of code, a plurality of control flow rules and at least one possible attack mechanism for a security attack, each control flow rule being associated to the possible attack mechanism of the portion of code and being based upon the expected execution of the portion of code in accordance with the reference control flow;
   selecting during execution of the portion of code by a processor, a control flow rule from the control flow rules based on a condition experienced during the execution of the portion of code;
   evaluating the control flow rule to detect a deviation from the reference control flow based on bus signals and internal signals from the processor;
   generating a response upon detection of the deviation from the reference control flow, wherein the response is based on the deviation and selected from a plurality of responses, and wherein the response is encoded as part of the control flow rule;
   analysing the portion of code to derive the reference control flow and to identify the at least one possible attack mechanism for the security attack;
   testing the control flow rules against the reference control flow and recording a number of attack mechanisms eliminated by each rule; and
   identifying a subset of the control flow rules to provide a reduced rule set, wherein the reduced rule set eliminates a maximum number of attack mechanisms.

2. A method according to claim 1, wherein selecting the control flow rule from the control flow rules is further based on one of a current value of a program counter, a previous value of the program counter, a previously executed instruction, or an instruction before a current instruction.

3. A method according to claim 1, wherein the reference control flow is a control flow graph.

4. A method according to claim 1, wherein the response comprises one of:
   triggering an interrupt for a processor;
   halting a processor;
   generating a memory fault;
   logging an entry into a fault log; and
   generating an alert.

5. A method according to claim 1, wherein the reference control flow and/or the control flow rules are generated prior to the execution of the portion of code.

6. A method according to claim 1, wherein the condition experienced during the execution of the portion of code is at least one of contents of a program counter, an instruction opcode, a flag, or a register value.

7. A method according to claim 1, wherein the control flow rule is stored in a region in a system memory, and wherein the control flow rule is pre-fetched and cached prior to the execution of the portion of code.

8. A method according to claim 1, wherein the control flow rule is a most stringent control flow rule for the portion of code.

9. A method according to claim 1, wherein the reference control flow is a series of function calls.

10. A method according to claim 1, further comprising identifying a number of attack mechanisms eliminated by each one of the control flow rules.

11. A computer-implemented system for enforcing control flow of a program, comprising:
   memory for storing a plurality of control flow rules generated for a portion of code, each control flow rule being associated with at least one possible attack mechanism for a security attack to the portion of code and based upon expected execution of the portion of code in accordance with a reference control flow, wherein the reference control flow is generated based on the portion of code during an execution of the portion of code under a normal operating condition, and wherein the reference control flow indicates the expected execution of the portion of code;
   at least one processor configured to execute the portion of code;
   a rule checking component arranged to evaluate a control flow rule during execution of the portion of code by a processor from the control flow rules based on a condition experienced during the execution of the portion of code to detect a deviation from the expected execution of the portion of code indicated in the reference control flow based on bus signals and internal signals from the processor, analyse the portion of code to derive the reference control flow and to identify the at least one possible attack mechanism for the security attack, test the control flow rules against the reference control flow and recording a number of attack mechanisms eliminated by each rule, and identify a subset of the control flow rules to provide a reduced rule set, wherein the reduced rule set eliminates a maximum number of attack mechanisms; and an intervention component arranged to generate a response upon detection of a deviation from the reference control flow wherein the response is based on the deviation and selected from a plurality of responses, and wherein the response is encoded as part of the control flow rule.

12. A system according to claim 11, wherein the rule checking component is configured to select the control flow rule from the control flow rules further based on one of a current value of a program counter, a previous value of the program counter, a previously executed instruction, or an instruction before a current instruction.

13. A system according to claim 11, wherein the reference control flow is a control flow graph.

14. A system according to claim 11, wherein the response comprises one of:
   a processor interrupt;
   a halt signal for halting a processor;
   a signal for generating a memory fault;
   an entry in a fault log; and
   an alert.

15. A system according to claim 11, wherein the reference control flow and/or at least one control flow rule is generated prior to the execution of the portion of code.

16. A system according to claim 11, wherein the rule checking component is configured to evaluate the control flow rule based upon contents of a program counter, an instruction opcode, a flag and/or a register value.

17. A system according to claim 11, wherein the rule checking component is a field programmable gate array.

* * * * *